US009369934B2

(12) United States Patent
Vikberg et al.

(10) Patent No.: US 9,369,934 B2
(45) Date of Patent: Jun. 14, 2016

(54) METHOD AND ARRANGEMENT IN A WIRELESS COMMUNICATION SYSTEM

(75) Inventors: Jari Vikberg, Järna (SE); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 121 days.

(21) Appl. No.: 14/113,929

(22) PCT Filed: Apr. 28, 2011

(86) PCT No.: PCT/SE2011/050527
§ 371 (c)(1),
(2), (4) Date: Oct. 25, 2013

(87) PCT Pub. No.: WO2012/148330
PCT Pub. Date: Nov. 1, 2012

(65) Prior Publication Data
US 2014/0051445 A1    Feb. 20, 2014

(51) Int. Cl.
H04W 36/00    (2009.01)
H04W 36/02    (2009.01)
(Continued)

(52) U.S. Cl.
CPC ......... *H04W 36/023* (2013.01); *H04L 67/2847* (2013.01); *H04W 36/02* (2013.01); *H04L 67/142* (2013.01); *H04W 36/14* (2013.01)

(58) Field of Classification Search
CPC ... H04W 36/02; H04W 36/14; H04W 36/023; H04W 28/0231; H04L 67/2847; H04L 67/142
USPC .................. 455/436–444; 370/331
See application file for complete search history.

(56) References Cited

U.S. PATENT DOCUMENTS 8,200,747 B2 *    6/2012  Apostolopoulos et al. ... 709/203
8,625,527 B2 *    1/2014  Zhu et al. .................. 370/331
(Continued)

FOREIGN PATENT DOCUMENTS

EP    1788775 A1    5/2007
EP    2061166 A2    5/2009
WO    2011032732 A1    3/2011

OTHER PUBLICATIONS

Unknown, Author, "3GPP TS 25.413 V9.4.0 (Sep. 2010)", 3rd Generation Partnership Project; Technical Specification Group Radio Access Network; UTRAN Iu interface Radio Access Network Application Part (RANAP) signalling (Release 9), Sep. 2010, pp. 1-407.
(Continued)

*Primary Examiner* — Charles Shedrick
(74) *Attorney, Agent, or Firm* — Murphy, Bilak & Homiller, PLLC

(57) ABSTRACT

A method in a network node for handling a cache session between the network node and a user equipment during a handover of the user equipment from a source cell of a first RAT to a target cell of a second RAT being different from the first RAT is provided. The user equipment and the network node are comprised in a wireless communications system. The network node receives (704) an identifier. The identifier identifies a cache session in the network node. The cache session is associated with a play-out for a media stream to the user equipment via a source base station serving the user equipment in the source cell. The network node identifies (705) the cache session as pertaining to the user equipment subject to said handover, by means of the received identifier. The network node then continues (708) the identified cache session via a target base station serving the target cell, when the handover of the user equipment from the source cell to the target cell has been performed.

22 Claims, 7 Drawing Sheets

(51) Int. Cl.
*H04L 29/08* (2006.01)
*H04W 36/14* (2009.01)

(56) References Cited

U.S. PATENT DOCUMENTS

2006/0258356 A1 11/2006 Maxwell et al.
2008/0310365 A1* 12/2008 Ergen et al. .................. 370/331
2010/0034089 A1* 2/2010 Kovvali ............ H04W 28/0231
370/235

OTHER PUBLICATIONS

Unknown, Author, "3GPP TS 36.413 V9.4.0 (Sep. 2010)", 3rd Generation Partnership Project; Technical Specification Group Radio Access Network; Evolved Universal Terrestrial Radio Access Network (E-UTRAN); S1 Application Protocol (S1AP) (Release 9), Sep. 2010, pp. 1-241.

Unknown, Author, "3GPP TS 48.008 V9.4.0 (Sep. 2010)", 3rd Generation Partnership Project; Technical Specification Group GSM/EDGE Radio Access Network; Mobile Switching Centre—Base Station System (MSC-BSS) interface; Layer 3 specification (Release 9), Sep. 2010, pp. 1-209.

Unknown, Author, "3GPP TS 48.018 V9.3.0 (Sep. 2010)", 3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 9), Sep. 2010, pp. 1-179.

* cited by examiner

METHOD AND ARRANGEMENT IN A WIRELESS COMMUNICATION SYSTEM

TECHNICAL FIELD

Embodiments herein relate to a network node and methods therein. In particular, it relates to handling a cache session between the network node and a user equipment during a handover of the user equipment from a source cell of a first Radio Access Technology (RAT), to a target cell of a second RAT.

BACKGROUND

In a typical wireless communication system, also referred to as cellular communication system or cellular radio system, user equipments, also known as mobile terminals and/or wireless terminals communicate via a Radio Access Network (RAN) to one Core Network (CN) or more CNs. The user equipments may be mobile stations or user equipment units such as mobile telephones also known as "cellular" telephones, and laptops with wireless capability, e.g., mobile termination, and thus may be, for example, portable, pocket, hand-held, computer-included, or car-mounted mobile devices which communicate voice and/or data with radio access network.

The radio access network covers a geographical area which is divided into cell areas, with each cell area being served by a base station, e.g., a Radio Base Station (RBS), which in some networks is also called eNB, eNodeB, NodeB or B node and which in this document also is referred to as a base station. A cell is a geographical area where radio coverage is provided by the radio base station equipment at a base station site. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more CNs.

The Universal Mobile Telecommunications System (UMTS) is a third generation mobile communication system (3G), which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. In the end of 2008 the first release, Release 8, of the 3GPP Long Term Evolution (LTE) standard was finalized and work on the Release 11 is currently going on.

Within the 3GPP specifications for LTE, the evolved radio access network is split into two parts: the Evolved UMTS Terrestrial Radio Access (E-UTRA), which describes the mobile part of LTE, and the Evolved UMTS Terrestrial Radio Access Network (E-UTRAN), which describes the base station part containing the Evolved Node B (eNB). Along with the LTE specifications, 3GPP is working on a complementary project called the System Architecture Evolution (SAE), which defines the split between LTE and a new Evolved Packet Core (EPC). This architecture is a flatter, packet-only core network that will help deliver the higher throughput, lower cost, and lower latency that is the goal of LTE. It is also designed to provide seamless interworking with existing 3GPP and non-3GPP access technologies.

Caching in wireless communication networks is a relatively known technology. Caching is based on that a large percentage of Internet traffic is repetitive and that eliminating repeating content all the way from its origin may offer an opportunity to reduce traffic and increase download speed. Therefore, the main principle is that copies of the content in e.g. the Internet are moved closer to the mobile users and stored in a cache, for example in different parts of the RAN, in the CN or just "above" the CN.

The main benefits that can be achieved with caching in wireless communication networks are:

Decrease the cost of transport in the wireless communication network. This is achieved "above the cache" as the cached information in principle is only transferred once in the transmission links above the cache.

Improved Quality of Experience for the mobile end-users. This is mainly achieved with lower delays as the cached information can be returned faster to the mobile users from the cache compared to if the information would be retrieved all the way from the original location.

Provide new services such as content hosting and storage/backup for operators. Mobile operators can sign agreements with the content providers that are based on that the mobile operator ensures that the content from a specific content provider is delivered in a better way to the mobile users in the mobile operator's network.

Caching may also be used for the content distribution towards the mobile users. Instead of retrieving the downloadable content from the media server 101, the content can be retrieved from a network node located in a wireless communication system. The content from the media server may be pushed in to the network node in the wireless communication system and then the wireless user equipments will receive the content directly from the network node, instead of from a media server. It is also worth mentioning that caching can be used for almost any Internet content.

In an evolved architecture, a common network node for LTE and 3G is enabled by adding an alternative control interface between a network node and either a Mobility Management Entity (MME) or an eNodeB. The MME is a control node in the EPC core network for the LTE radio access network. The network node is common in the RAT-technologies and may be denoted "RNC-cache" as it may be placed for example in the RNC for 3G.

Caching as such may have long session times for playing a media stream such as e.g. WEB-TV with an hour long TV-program. A generation of content from the network node is in this document denoted "Cache-play-out". During the period of an ongoing Cache-play-out, handover between RAT-technologies may occur.

Therefore, mobility support is required to support session-continuity for "Cache-play-out" from the network node. This applies for mobility scenarios such as e.g.:

Intra-RAT WCDMA Mobility
Intra-RAT LTE Mobility
Intra-RAT GSM Mobility
Inter-RAT Mobility between different RATs A User Equipment may have a set of ongoing cache play-out sessions, from now on denoted "cache sessions". Each cache session is identified and described by a state-identifier denoted UE cache session. The content of the UE cache session depends of the type of network node and the type of content. The type of content may e.g. be video or audio. One example of UE cache session identifier may be the typical IP-flow description of five tuples, i.e. IP-source and IP-destination address, TCP or UDP source port, TCP or UDP destination port and Protocol (e.g. TCP or UDP), in combination with content specific identifiers.

A problem with Inter-RAT (IRAT) handovers is that the UE-cache session will be lost, since the source base station or source radio network controller and the target base station and target radio network controller can not recognize the UE-cache session if it is started in a common network node for another RAN than the base station or radio network controller itself.

The actions of an IRAT handover from LTE to WCDMA are briefly described below for the case when the same RNC-Network node is used on both RATs. It is worth noting that some actions and nodes are not described or are simplified but these do not impact the background discussion.

Initially the user equipment is active in LTE and the RNC-network node is performing play-out for at least one media stream. The UE session in the network node is known by identifiers specific for the LTE side and S1-interface. LTE uses its own temporary connection identifiers that are created by the MME "MME UE S1AP ID" and transferred in control signaling to the base stations. Within LTE network infrastructure, the S1 interface is the communications interface between an LTE base station and the EPC.

An IRAT handover is triggered from the source base station, i.e. an eNB in LTE, to a target RNC. The source base station selects the target UTRAN cell of WCDMA, for example based on measurements received from the user equipment. In this example the target RNC controlling the selected target UTRAN cell is the same RNC that comprises the current RNC-network node for the user equipment.

A handover request such as e.g. an S1 Application Protocol (S1AP) Handover Required message is sent from the source base station to the MME.

The MME forwards the received handover request to the target Serving General Packet Radio Service (GPRS) Support Node (SGSN). Please note that the handover request may e.g. be denoted "relocation request", or "handover required" in some protocols.

The target SGSN forwards the handover request to the RNC controlling the selected target UTRAN cell and to the RNC-network node.

The problem is that the RNC-network node can not associate the received handover request or a relocation request with an active state in the network node, since it does not know that the handover request is related to the user equipment active in LTE. Therefore it can not continue the play-out from the network node after the handover is performed.

SUMMARY

It is therefore an object of embodiments herein to provide a way of improving the performance of Inter RAT handovers.

According to a first aspect of embodiments herein, the object is achieved by a method in a network node for handling a cache session between the network node and a user equipment during a handover of the user equipment from a source cell of a first RAT to a target cell of a second RAT being different from the first RAT. The user equipment and the network node are comprised in a wireless communications system. The network node receives an identifier. The identifier identifies a cache session in the network node. The cache session is associated with a play-out for a media stream to the user equipment via a source base station serving the user equipment in the source cell. The network node identifies the cache session as pertaining to the user equipment subject to said handover, by means of the received identifier. The network node then continues the identified cache session via a target base station serving the target cell, when the handover of the user equipment from the source cell to the target cell has been performed.

According to a second aspect of embodiments herein, the object is achieved by a network node for handling a cache session between the network node and a user equipment during a handover of the user equipment from a source cell of a first RAT, to a target cell of a second RAT being different from the first RAT. The user equipment and the network node are comprised in a wireless communications system. The network node comprises a receiving unit configured to receive an identifier, which identifier identifies a cache session in the network node. The cache session is associated with a play-out for a media stream to the user equipment via a source base station serving the user equipment in the source cell. The network node further comprises a session handling unit configured to identify the received cache session as pertaining to the user equipment subject to said handover, by means of the received identifier. The network node further comprises a sending unit configured to continue the identified cache session via a target base station serving the target cell, when the handover of the user equipment from the source cell to the target cell has been performed.

Since the identifier identifying the ongoing cache session is received by the network node, the network node can identify the ongoing cache session as pertaining to the user equipment subject to a handover, and then continue the identified cache session via a target base station serving the target cell, when the handover has been performed. This results in an improved performance of Inter RAT handovers since the cache session can be identified and continued after the Inter RAT handover.

An advantage with embodiments herein is that it allows the same network node to be used for different RATs and improves the end user perceived experience as the cache-play-out continues even during handover between the RATs.

BRIEF DESCRIPTION OF THE DRAWINGS

Examples of embodiments herein are described in more detail with reference to attached drawings in which.

DETAILED DESCRIPTION

Embodiments herein incorporate information about a cache session of a user equipment in handover preparation phase signalling between a source RATs and a target RAT in a RAN Transparent containers". The RAN Transparent container comprises one or more information elements that are sent between the source RAT and the target RAT via the core network without the core network modifying the included information. The embodiments herein are related to so called Inter-RAT (IRAT) handovers that are handovers between different RATs and the terms radio access technology (RAT) and radio access network (RAN) may be used in the description as following. An IRAT-handover is a handover between RANs that are of different RAT. The term RAN/RAT may be used to describe a specific type of radio access network/type, for example LTE RAN/RAT, WCDMA/UTRAN RAN/RAT and GSM/GPRS/EDGE RAN/RAT.

A requirement of the evolved system is to have a common network node for both WCDMA and LTE in an RNC-level even if the RNC as a node do not exist in the LTE-architecture. Embodiments herein let S1-U interface pass the same network node on the path between LTE base station and EPC. The S1-U interface is standardized between the LTE base station (eNB) and the Serving Gateway (SGW) in the EPC. Thus the RNC in WCDMA is used also for LTE and other RAN networks.

As part of formation of the embodiments herein, a problem will first be identified and discussed. A problem with IRAT handovers is the lack of common identifier available in WCDMA, LTE, and GSM RANs. The network node is in Access Stratum, i.e. does not always have access to permanent user equipment identifiers, such as e.g. IMSI that is always known in the core network. The network node will only be aware of identities that are used in the current RAT for the user equipment and are only unique within the current RAT. IMSI is normally available in WCDMA RNC but is not available in LTE base stations. LTE uses its own temporary connection identifiers that are created by the MME and the eNB such as "MME UE S1AP ID" and "eNB UE S1AP ID" and are transferred in the control signaling between the MME and the base stations. A further object of embodiments herein is thus to provide a way for a network node to identify a related user equipment cache session and/or cache instance for an incoming IRAT handover request.

Embodiments will be exemplified in the following non-limiting description.

Figure 1:
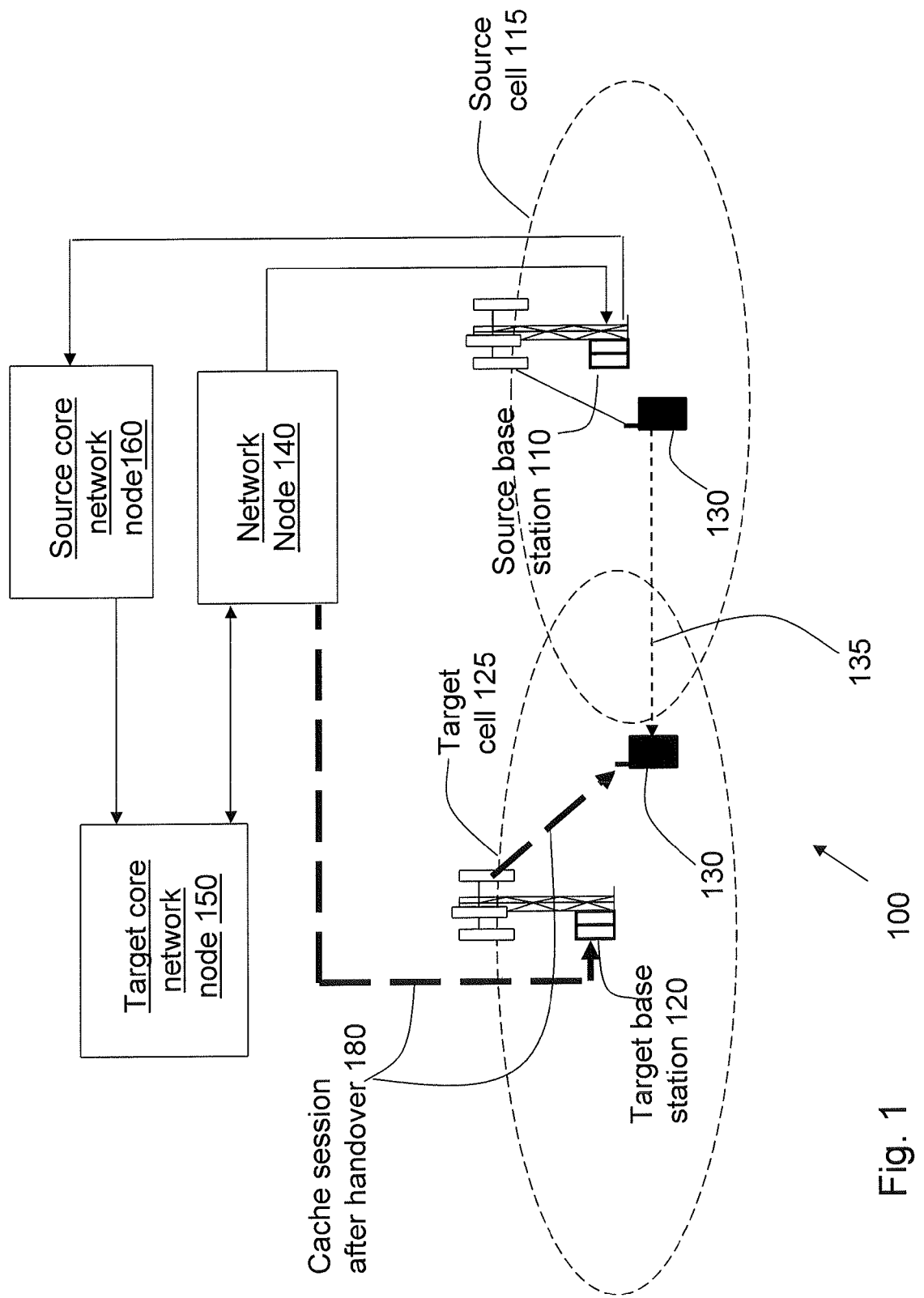
FIG. 1 is a schematic block diagram illustrating embodiments in a wireless communications system.

FIG. 1 depicts a wireless communications system 100 in which embodiments herein may be implemented. The wireless communications system 100 may e.g. comprise radio access networks such as an LTE radio access network, a WCDMA/UTRAN radio access network, a GSM/GPRS/EDGE radio access network, or any 3GPP cellular network, or any cellular network or system.

The wireless communications system 100 comprises a base station 110. The base station 110 is a radio base station serving a cell 115. The base station 110 may e.g. be a radio base station such as a NB, Node B, an eNB, eNodeB, or a Home Node B, a Home eNode B, a GSM/GPRS/EDGE radio base station (BTS) or any other network unit capable to serve a user equipment in a cellular communications system. In scenarios described herein the base station 110 will act as and is referred to as a source base station 110, and the cell 115 will act as and is referred to as a source cell 115. This will be further described below. The source cell 115 is of a first RAT. The first RAT may e.g. be an LTE radio access network, a WCDMA/UTRAN radio access network, or a GSM/GPRS/EDGE radio access network or any other 3GPP or 3GPP2 radio access network or radio access network of any cellular network or system.

The wireless communications system 100 further comprises a second base station 120. The second base station 120 is a radio base station serving a second cell 125. The second base station 120 may e.g. be a radio base station such as a NB, Node B, an eNB, eNodeB, or a Home Node B, a Home eNode B, a GSM/GPRS/EDGE radio base station (BTS) or any other network unit capable to serve a user equipment in a cellular communications system. In scenarios described herein the second base station 120 will act as and is referred to as a target base station 120, and the cell 125 will act as and is referred to as a target cell 125. This will be further described below. The target cell 125 is of a second RAT being different from the first RAT. The second RAT may e.g. be an LTE radio access network, a WCDMA/UTRAN radio access network, or a GSM/GRPS/EDGE radio access network or any other 3GPP or 3GPP2 radio access network or radio access network of any cellular network or system. Thus as an example, when the first RAT e.g. is an LTE radio access network, the second different RAT may e.g. be a WCDMA/UTRAN radio access network, or as another example, when the first RAT e.g. is a WCDMA/UTRAN radio access network, the second different RAT may e.g. be GSM/GPRS/EDGE radio access network just to mention a few examples of possible combinations.

A user equipment 130 is located within the source cell 115. The user equipment 130 is configured to communicate within the wireless communications system 100 via the base station 110 over a radio link when the user equipment 130 is present in the source cell 115 served by the base station 110. The user equipment 130 may e.g. be a terminal, e.g. a mobile terminal or a wireless terminal, a mobile phone, a computer such as e.g. a laptop, Personal Digital Assistants (PDA), a surf tablet or any other radio network unit capable to communicate with a base station over an air interface. The user equipment 130 in the source cell 115 moves from the source cell 115 of the first RAT towards the target cell 125 of the second RAT. This movement is referred to by the arrow 135.

The wireless communications system 100 further comprises a network node 140. The network node 140 comprises a RAN cache being common for the different RATs and RANs within the wireless communications system 100, such as for the first RAT and the second RAT within the wireless communications system 100. The network node 140 comprises a memory and logics to perform caching. This means that copies of content in e.g. the Internet such as a media stream, are stored in the network node 140. The content is in this way moved move closer to the mobile users.

The wireless communications system 100 further comprises a target core network node 150. The target core network node 150 may be an SGSN, or a MME, or any other core network node that is part of the IRAT handover preparation signalling in any type of core network and forwards the handover preparation signalling towards the target RAT.

The wireless communications system 100 may further comprise a source core network node 160, such as an MME or a SGSN. The source core network node 160 may be of any RAT, such as e.g. LTE, WCDMA/UTRAN or GSM/GPRS/EDGE. The source core network node 160 forwards the handover preparation signalling from the source RAT towards the target core network node 150.

In embodiments herein, information about a user equipment cache session is comprised in handover signalling between the source and target RATs, for example in RAN Transparent containers.

According to embodiments herein, before a handover is triggered, the source network node side, such as the network node 140 and/or a source network node 440 sown in FIG. 4 below, creates an identifier of a cache session that will be used to identify the user equipment cache session at a specific network node, such as the network node 140 and/or a target network node 170 shown in FIG. 4 which is described below. The identifier may also be extended to comprise information about the network node 140 itself i.e. to identify a specific network node so that it can be found. The created identifier may be a so called Common RAN cache identifier. The identifier is included in handover preparation signalling from the source RAN/RAT and network node towards the target RAN/RAT and network node. Note that the term "handover" used in this document also comprises relocation or any other similar process of handing over a user equipment from a source base station to a target base station. The target side uses the received identifier to identify the correct user equipment cache session.

Figure 2:
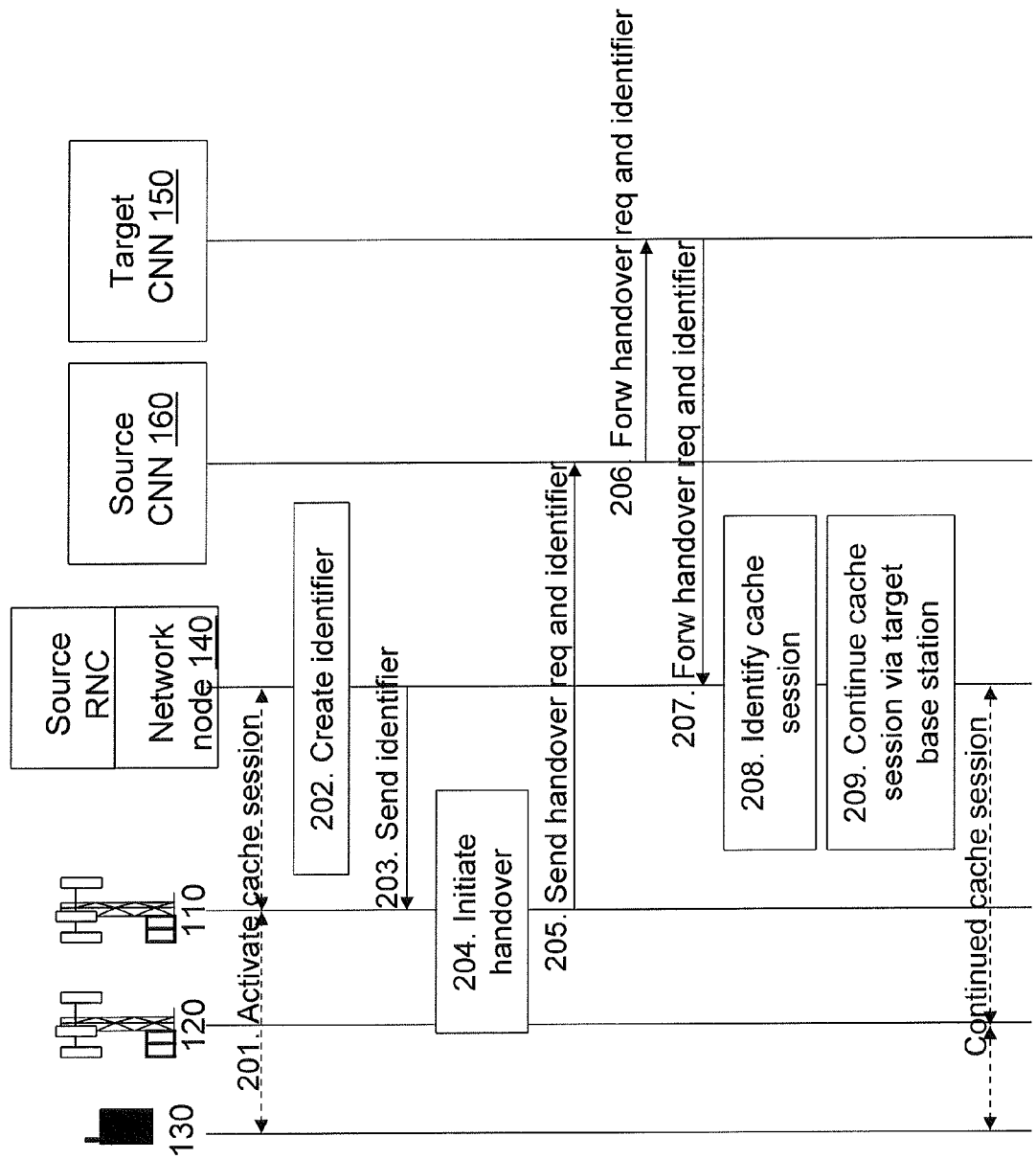
FIG. 2 is a combined flowchart and signalling scheme depicting embodiments in a wireless communications system.
Figure 3:
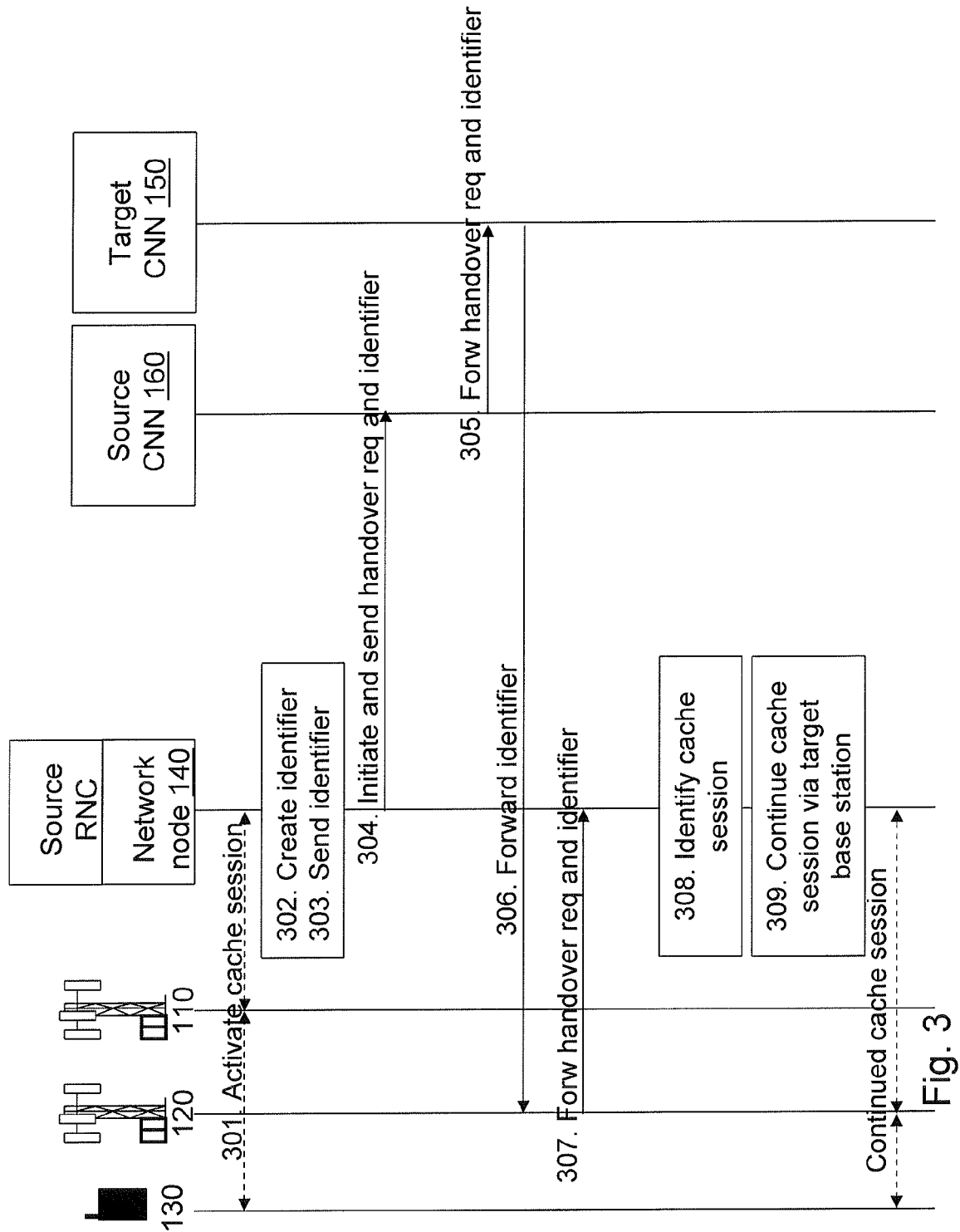
FIG. 3 is a combined flowchart and signalling scheme depicting embodiments in a wireless communications system.

There are two different scenarios. According to some embodiments the target network node and source network node are the same. In the examples herein the network node 140 may be both a source network node and a target network node. This is depicted in FIGS. 1, 2 and 3. In these embodiments, the identified cache session is after the handover continued from the network node 140 via the target base station 120 to the base station as indicated by the dashed arrow 180 in FIG. 1. According to some other embodiments the target network node and source network node are different network nodes. This is depicted in FIGS. 4 and 5. In the examples herein the network node 440 is in these scenarios only a source network node and the target network node 170 is a target network node. After handover, the identified cache session continues from the network node 140, via the target network node 170, and via the target base station 120 to the base station as indicated by the dashed arrows 190 in FIG. 4.

If the target and source side's network nodes are the same, then the received identifier may be directly used to identify the cache session of the user equipment 130.

If the target and source side's network nodes are different, then the identifier should further identifies the network node 140. The target side such as the target network node 170 may by means of the identifier, link in the source network node, i.e. network node 440 so that the network node 440 can continue the cache play-out for the user equipment 130 via the target network node 170. The target side also provides the received identifier information to the source side for this purpose.

A method for handling a cache session between the network node 140 and the user equipment 130 during a handover of the user equipment 130 from the source cell 115 of the first RAT to a target cell 125 of the second RAT according to some embodiments, will now be described with reference to the combined signalling diagram and flowchart depicted in FIG. 2. In this example the target network node and source network node are the same. FIG. 2 exemplifies embodiments herein regarding an IRAT handover from the source cell 115 using LTE, to the target cell 125 using WCDMA. As mentioned above, this example concerns the case when the same network node, i.e. network node 140, is used in both the target cell 125 and the source cell 115. In this case the network node 140 is or is comprised in the radio network controller (RNC) for the target cell 125 and is therefore also called target radio network controller in this embodiment. The method comprises the following actions, which actions may as well be carried out in another suitable order than described below:

Action 201

The user equipment 120 is active in the source cell 115 and have need of starting a play-out for a media stream, such as e.g. a video. Thus the network node 140 activates a cache session. In some embodiments more than one cache session may be activated in parallel. The cache session is associated with the play-out for the media stream to the user equipment 130 via the source base station 110 serving the user equipment 130 in the source cell 115. The network node 140 is performing play-out for at least one media stream. The user equipment session in the network node 140 is known by identifiers specific for the RAT in the source cell 115, i.e. LTE and S1-interface.

Action 202

In this action, the network node 140 creates an identifier. The identifier identifies the cache session in the network node 140. This means e.g. that the network node 140 may select an identifier such as a common RAN cache identifier that identifies the specific user equipment session, or possibly sessions activated in the network node 140. As the network node 140 at this stage is not aware of if any future IRAT handover would result in the usage of the same or different network node, the common RAN cache identifier may also include information that identifies the network node 140.

Action 203

The network node 140 provides the identifier to a radio access network node initiating inter RAT handovers which in this scenario is the source base station 110. This is to enable the identifier to be added to a handover request to be sent to a target radio network controller node that in this embodiment is part of the network node 140. This will be described in Action 204.

This may take place with different variants. In some embodiments this action is performed via a control plane interface between the network node 140 and the source base station 110. I.e. for example a specific control plane interface between the network node 140 and source base station 110 may be used to pass the identifier to the source base station 110.

In some embodiments this action is performed by adding the identifier in user plane packets for example in the GTP Userplane (GTP-U) header to be sent to the user equipment 130 via the source base station 110. GTP-U is the protocol used for example in the S1-U interface described above. The identifier is then removed by the source base station 110 before the user plane data is forwarded to the user equipment 130.

The identifier may also comprise bearer identities such as E-UTRAN Radio Access Bearer (E-RAB), Radio Access Bearer (RAB), Packet Flow Context (PFC) that are concepts used in the different RANs: which comprise the flows served by the network node 140. For example, an E-RAB refers to the combination of the S1 bearer between the source base station 110 and a SGW in the EPC (not shown in FIG. 1) and the corresponding radio bearer between the source base station 110 and the user equipment 130.

Action 204

The source base station 110 receives the identifier from the network node 140. This enables the source base station 110 to add the identifier to a handover request to be sent to a radio network controller node that in this embodiment is or comprises the network node 140. The handover request is initiated by the source base station 110.

An IRAT handover is triggered, i.e. initiated from the source base station 110 to the target radio controller. The source base station 110 includes the received identifier in a message to be sent in Action 205 to the source core network node 160 such as e.g. a source MME for forwarding. The message may e.g. be a S1AP Handover required message according to LTE.

An Information Element (IE) that may be used is called "Source to Target Transparent Container" (StTTC) that is the term used herein for the described RAN Transparent Container. The Source to Target Transparent Container is an information element that is used to transparently pass radio related information from the handover source to the handover target through the EPC and GSM/WCDMA CN. It is produced by the source RAN node such as e.g. the source base station 110 and is transmitted to the target RAN node such as the target radio network controller and it includes a so called transparent container from the source RAN node to the target RAN node. In IRAT handovers, the IE may be encoded according to the specifications of the target system, i.e. if handover to WCDMA, then WCDMA specifications define the contents of the transparent container etc.

The following are some different possibilities for the identifier to be included in depending on which handover case is taking place:

a. If the target RAT is LTE, the identifier may be included in the "Source eNB to Target eNB Transparent Container IE" However, the intra-LTE handover case may likely be supported also by using other identifiers available in the signalling.

b. If the target RAT is WCDMA/UTRAN, the identifier may be included in the "Source RNC to Target RNC Transparent Container IE".

c. If the target RAT would be GSM/GERAN, the identifier may be included in the "Source BSS to Target BSS Transparent Container IE".

d. If the target RAT would be GSM/GERAN and a Single-Radio Voice Call Continuity (SRVCC) handover would be triggered, then the identifier may be included in the "Old BSS to New BSS information IE".

Action 205

The source base station 110 sends the identifier e.g. in a message to the source core network node 160 such as an MME for forwarding. This may e.g. be performed in a S1AP Handover Required message to the MME. The identifier may be forwarded transparently in the StTTC included in the S1AP Handover Required message.

Action 206

The source core network node 160 forwards the received identifier e.g. in a so called Forward Relocation Request message and sends it to the target network node 150 such as a target SGSN for forwarding. This may e.g. be performed transparently in an StTTC included in the Forward Relocation Request.

Action 207

The target network node 150 forwards the handover request to the target radio network controller RNC controlling the selected UTRAN cell and in this case the network node 140 is the target RNC. The "Common RAN cache identifier" may be forwarded transparently in an StTTC, i.e. the network node 140 receives the identifier from the target core network node 150.

Action 208

The network node 140 identifies the activated cache session as pertaining to the user equipment 130 subject to said handover, by means of the received identifier.

I.e. the network node 140 can identify and relate the received handover request with an active state in the network node 140. This enables the network node 140 to continue the play-out from the network node 140 after the handover is performed.

Action 209

The network node 140 continues the identified cache session via the target base station 120 serving the target cell 125.

This is performed when the handover of the user equipment 130 from the source cell 115 to the target cell 125 has been performed.

The following section briefly shows the signalling sequences for the other direction i.e. when handover is performed from WCDMA to LTE. A method for handling a cache session between the network node 140 and the user equipment 130 during a handover of the user equipment 130 from the source cell 115 of the first RAT to a target cell 125 of the second RAT according to some embodiments wherein the, will now be described with reference to the combined signalling diagram and flowchart depicted in FIG. 3. In these embodiments, the target network node and source network node are the same. FIG. 3 exemplifies embodiments herein regarding an IRAT handover from the source cell 115 using WCDMA, to the target cell 125, in this example using LTE, I.e. opposite scenario compared to the embodiments described in relation to FIG. 2. As mentioned above, this example concerns the case when the same network node, i.e. network node 140, is used in both the target cell 125 and the source cell 115. The method comprises the following actions, which actions may as well be carried out in another suitable order than described below:

Action 301

The user equipment 130 is active in the source cell 115 and have need of starting a play-out for a media stream, such as e.g. a video. Thus the network node 140 activates a cache session. In some embodiments more than one cache session may be activated in parallel. The cache session is associated with the play-out for the media stream to the user equipment 130 via the source base station 110 serving the user equipment 130 in the source cell 115. The network node 140 is performing play-out for at least one media stream. The user equipment session in the network node 140 is known by identifiers specific for the RAT in the source cell 115. As the source cell 115 is a WCDMA cell in this case the RNC controlling the source cell may be aware of the IMSI. This action is similar to Action 201.

Action 302

In this action, the network node 140 creates an identifier. The identifier identifies the cache session in the network node 140. This means e.g. that the network node 140 may select an identifier such as a common RAN cache identifier that identifies the specific user equipment session or possibly sessions activated in the network node 140. As the network node at this stage is not aware of if any future IRAT handover would result in the usage of the same or different network node, the common RAN cache identifier may also include information that identifies the network node 140. This action is similar to Action 202.

Action 303

The network node 140 provides the identifier to the radio access network node initiating inter RAT handovers for forwarding, which in this scenario is a source RNC. The RNC in this embodiment is located in the same unit as the network node 140, so in this case the providing means that the network node 140 just provides the identifier to the handover request to be sent by the source RNC.

In WCDMA the RNC is the node that initiates an IRAT handover. The identifier is added to a handover request to be sent to the target base station 120 via the target core network node 150 via the source network node 160 such as a source SGSN. The identifier may be forwarded transparently in an StTTC. Here the target RAT is LTE, so the identifier may be included in the "Source eNB to Target eNB Transparent Container IE" defined in. This action may be similar to Action 203.

Action 304

The RNC initiates and sends the identifier in a handover request message to the source core network node 160 such as a source SGSN for forwarding. This may e.g. be performed in a relocation request message. The identifier may be forwarded transparently in the StTTC.

Action 305

The source core network node 160 forwards the received identifier e.g. in a forward relocation request message to the target network node 150 such as a target MME for forwarding. This may e.g. be performed transparently in the StTTC.

Action 306

The target network node 150 forwards the identifier comprised in the handover request to the target base station 120. The identifier may be forwarded transparently in the StTTC.

Action 307

The target base station 120 sends the identifier to the network node 140. In this case the identifier is forwarded as part of new signalling between the target base station 120 and the network node 140 as the handover preparation signalling is terminated in the target base station 120. The network node 140 receives the identifier from the target core network node 150 via the target base station 120. This action is similar to Action 207.

Action 308

The network node 140 identifies the activated cache session as pertaining to the user equipment 130 subject to said handover, by means of the received identifier.

This action is similar to Action 208.

Action 309

The network node 140 continues the identified cache session via the target base station 120 serving the target cell 125. This is performed when the handover of the user equipment 130 from the source cell 115 to the target cell 125 has been performed. This action is similar to Action 208.

Figure 4:
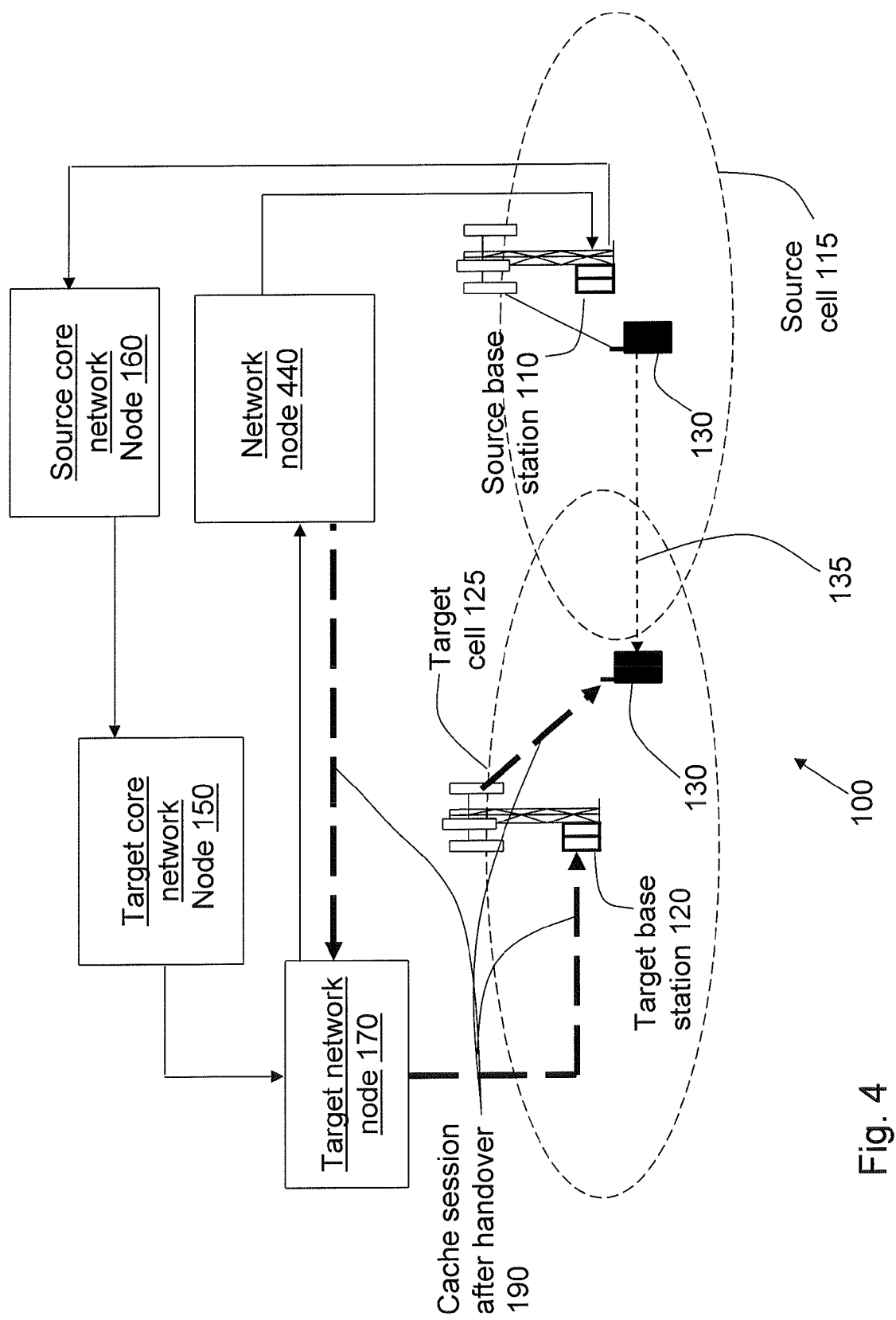
FIG. 4 is a schematic block diagram illustrating embodiments in a wireless communications system.
Figure 5:
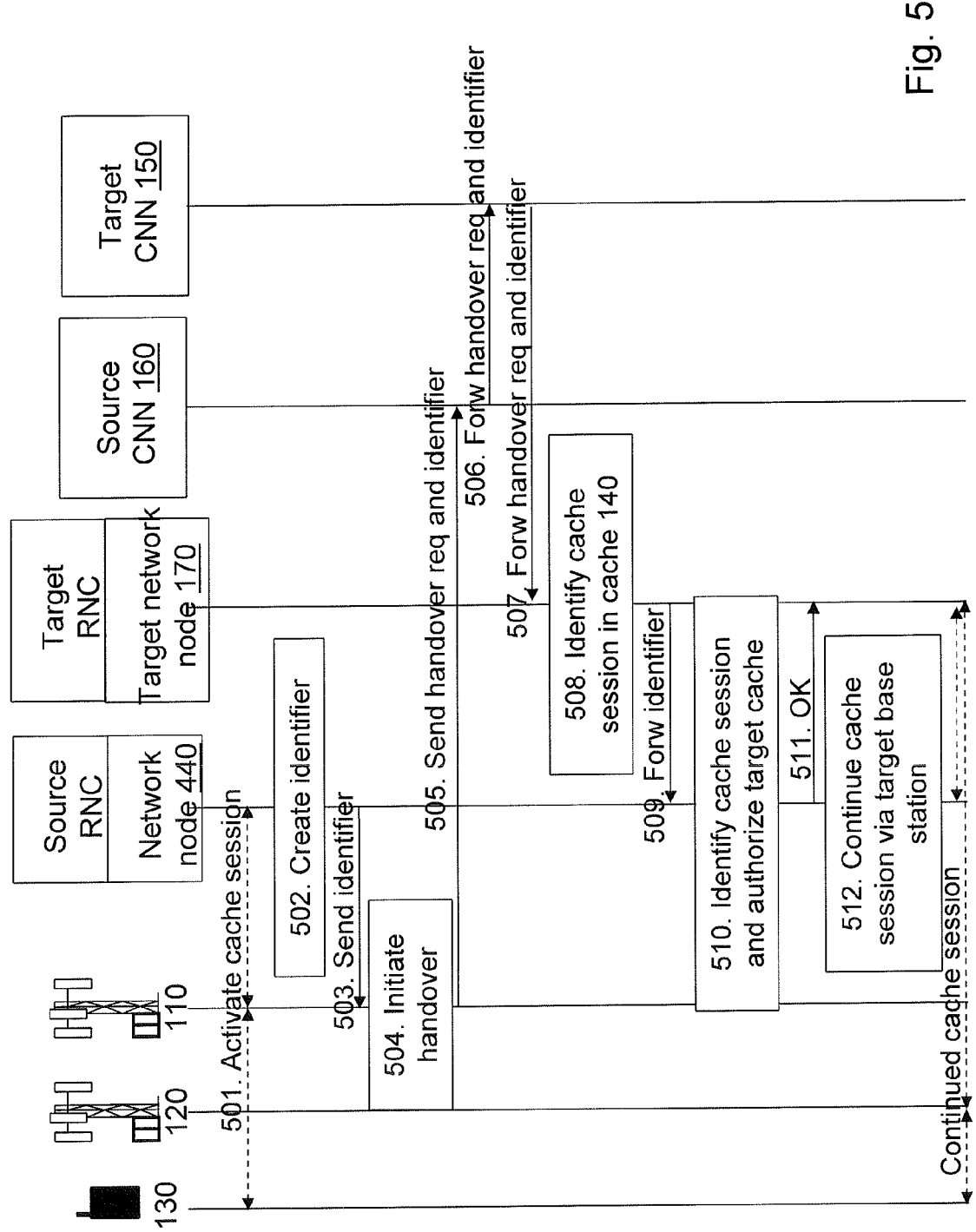
FIG. 5 is a combined flowchart and signalling scheme depicting embodiments in a wireless communications system.

FIG. 4 depicts a wireless communications system 100 in which some embodiments herein may be implemented. In these embodiments the target network node and source network node are different network nodes after the handover. FIG. 4 differs from FIG. 1 in that the wireless communications system 100 further comprises a target network node 170 and in that the network node here referred to as 440, is a source network node. After handover, the identified cache session continues from the network node 440, via the target network node 170, and via the target base station 120 to the base station as indicated by the dashed arrows 190. The target network node 170 may be a RAN network node being common for the different RATs within the wireless communications system 100, such as for the first RAT and the second RAT within the wireless communications system 100. The target network node 170 comprises a memory and logics to perform caching. This means that copies of content in e.g. the Internet such as a media stream, are stored in the network node. The content is in this way moved closer to the mobile users.

Caching in RAN uses mobility aspects as described below in FIG. 5 that are some what complicated as normal mobility may mean that 1) the user equipment 130 moves between two different network nodes and/or 2) the user equipment 130 moves between two different RATs. Mobility in this section means only active/connected mode mobility and idle mode mobility is seen as out of scope for RAN caching.

The basic case for mobility is however to support mobility for the case when the user equipment 130 moves between cells in the same RAT and is served by the same RAN network node. An example of this is when the RAN network node is in the RNC and the user equipment 130 moves between two different cells served by the same RNC.

Following different mobility cases do exist and only the last Inter-RAT mobility under each main point are in the scope for this embodiments herein:

Mobility within One RAN Cache
Intra-RAT WCDMA Mobility
Intra-RAT LTE Mobility
Intra-RAT GSM Mobility
Inter-RAT Mobility between different RATs
Mobility Between Two RAN Caches
Intra-RAT WCDMA Mobility
Intra-RAT LTE Mobility
Intra-RAT GSM Mobility
Inter-RAT Mobility between different RATs According to embodiments herein, the cache play-out shall continue from the source cache for all sessions/flows started in that cache, i.e. from the network node 440 if started there. All new sessions started after the handover may be anchored in the target cache. Here it is also important to understand that by adopting this principle, one user equipment may have multiple RAN cache sessions performing play-out to it from multiple different network nodes depending on the user equipment mobility pattern and the length of the cached content.

A method for handling a cache session between the network node 440 and the user equipment 130 during a handover of the user equipment 130 from the source cell 115 of the first RAT to a target cell 125 of the second RAT according to some embodiments, will now be described with reference to the combined signalling diagram and flowchart depicted in FIG. 5. In this example the target network node and source network node are different which can be seen from FIG. 4. FIG. 5 exemplifies embodiments herein regarding an IRAT handover from the source cell 115 using LTE, to the target cell 125 using WCDMA. As mentioned above, this example concerns the case when different network nodes, i.e. network node 440 being the source network node used in the source cell 115 and the target network node 170 is used in the target cell. I.e. the target network node 170 is associated with the target cell 125 and the network node 440 is a source network node associated with the source cell 115. The Actions 501 and 503-506 in FIG. 5 are exactly same as the Actions 201 and 203-205 in FIG. 2. Therefore the steps 501 and 503-506 are very briefly described in relation to FIG. 5. Different actions are performed from Action 507 when the target network node 170 identifies by the existence and contents of the identifier that the source cache, i.e. the network node 440 is performing cache play-out towards the user equipment performing handover. In this case the target network node 440 is also acting as the radio network controller (RNC) for the target cell 125 and is therefore also called target radio network controller in this embodiment. The method comprises the following actions, which actions may as well be carried out in another suitable order than described below:

Action 501

The user equipment 130 is active in the source cell 115 and have need of starting a play-out for a media stream, such as e.g. a video. Thus the network node 440 activates a cache session. In some embodiments more than one cache session may be activated in parallel. The cache session is associated with the play-out for the media stream to the user equipment 130 via the source base station 110 serving the user equipment 130 in the source cell 115. This Action is similar to Action 201.

Action 502

In this action, the network node 440 creates an identifier. The identifier identifies the cache session in the network node 440. An object according to these embodiments is that when handover is triggered, the source cache, i.e. network node 440, shall create an identifier that both identifies the network node 440 and the cache session and include the identifier as part of the handover preparation signalling. Therefore the identifier in these embodiments further identifies the network node 440, thereby enabling the target network node 170 to send the identifier to the network node 440.

In some embodiments a security information is also created in this action, which security information is attached to the identifier to be sent in the handover request.

Action 503

The network node 440 provides the identifier to the radio access network node initiating inter RAT handovers which in this scenario is the source base station 110. This is to enable the identifier to be added to a handover request to be sent to a target radio network controller that in this embodiment is part of the target network node 170. The handover is in this scenario initiated by the source base station 110, which will be described in Action 204.

This may take place with different variants. In some embodiments this action is performed via a control plane interface between the network node 440 and the source base station 110. I.e. for example a specific control plane interface between the network node 440 and source base station 110 may be used to pass the identifier to the source base station 110.

In some embodiments this action is performed by adding the identifier in user plane packets for example in the GTP-U header to be sent to the user equipment 130 via the source base station 110. The identifier may then be removed by the source base station 110 before the user plane data is forwarded to the user equipment 130.

Action 504

The source base station 110 receives the identifier from the network node 440. This enables the source base station 110 to add the identifier to a handover request to be sent to the target radio network controller node that in this embodiment is part of the target network node 170. The handover request is initiated by the source base station 110. I.e. when handover is triggered, the source cache, i.e. network node 440, includes the identifier that in these embodiments both identifies the network node 440 and the cache session as part of the handover preparation signalling.

Action 505

The source base station 110 sends the identifier e.g. in a message to the source core network node 160 such as an MME for forwarding. This may e.g. be performed in a S1AP Handover Required message to the MME. The identifier may be forwarded transparently in the StTTC included in the S1AP Handover Required message.

Action 506

The source core network node 160 forwards the received identifier e.g. in a so called Forward Relocation Request message and sends it to the target network node 150 such as a target SGSN for forwarding. This may e.g. be performed transparently in an StTTC included in the Forward Relocation Request.

Action 507

The target network node 150 forwards the handover request to the target radio network controller RNC controlling the selected UTRAN cell that in this case is part of the Target cache 170 comprising the identifier. The identifier may be forwarded transparently in an StTTC.

Action 508

The target network node 170 receives the handover request comprising the identifier identifying the cache session and the source network node, i.e. the network node 440.

I.e. in this Action the target network node 170 identifies by means of the existence and contents of the identifier that the source network node, i.e. the network node 440 is performing a cache session play-out towards the user equipment 130 that is performing a handover.

Action 509

In this step the identifier is forwarded to the network node 440. The identifier is received from the target network node 170 and may be comprised in a message such as a target cache transport information message. The message may indicated that the identified cache session shall be continued by forwarding the play-out of the media stream via the target network node 170 to the user equipment 130. The identifier is used by the target network node 170 to contact the correct source cache, in this case the network node 440. The target network node 170 informs the network node 440 to prepare for the handover by sending to the network node 440, information comprising the identifier identifying the cache session.

E.g., the target network node 170 may provide "Target Transport Information" to the network node 440 and this information informs the source cache, i.e. network node 440 how it is supposed to forward the cache play-out for this user equipment 130 to the target network node 170. The information may be included as part of "Target Transport Information" such as for example Internet Protocol (IP) address, UDP port and Tunnel Endpoint Identifier (TEID) for the case when GTP-U is used between source network node 440 and the target network node 170.

Action 510

The network node 440 receives the identifier from the target network node 170 and identifies the activated cache session as pertaining to the user equipment 130 subject to said handover, by means of the received identifier. I.e. the network node 440 identifies and relates the received handover request to the user equipment 130 and its cache play-out that now moves towards the new target network node 170. This enables the network node 440 to continue the play-out from the network node 440 after the handover is performed. It is assumed that GTP-U may also be used as the protocol between the different caches.

In some embodiments, the security information is sent together with the identifier in the Action 503 of providing the identifier to the source base station 110 which is received via the target network node 170. In these embodiments the network node 440 authorize the target network node 170 to receive the play-out of the media stream for forwarding it to the user equipment 130. This may be performed by establishing that the received security information corresponds to the created security information.

Action 511

In some embodiments, the network node 440 sends a notification to the target network node 170 that it has been authorized to receive the play-out of the media stream for forwarding it to the user equipment 130. This may be performed by sending an acknowledgement of the received information comprising the identifier to the target network node 170.

Action 512

The network node 440 continues the identified cache session via the target base station 120 serving the target cell 125. This is performed when the handover of the user equipment 130 from the source cell 115 to the target cell 125 has been performed.

In these embodiments, the identified cache session is continued by transmitting the play-out of the media stream via the target network node 170 and via the target base station 120 to the user equipment 130.

In some embodiments, GTP-U is used as protocol for the transmission of the play-out of the media stream from the network node 440 to the target network node 170.

The main benefit with this approach is that it also works for the case when the user equipment 130 has performed multiple handovers and when there would exist more than two network nodes performing cache-play-out for the user equipment 130. This case may be handled as following. The handover preparation signalling is enhanced so that multiple identifiers can be included for one user equipment 130. An example of this would be the case when a first network node, Cache-1 and a second network node, Cache-2, are performing play-out for the user equipment 130 and the user equipment 130 performs handover to a third network node, Cache-3. In this case the Cache-3 may receive two different identifiers, one created by Cache-1 and one created by Cache-2. Cache-3 is then able to contact both Cache-1 and Cache-2 to enable continuous cache-play-out from both Cache-1 and Cache-2.

The following section briefly shows the signalling sequences for the other direction i.e. when handover is performed from WCDMA to LTE.

Figure 6:
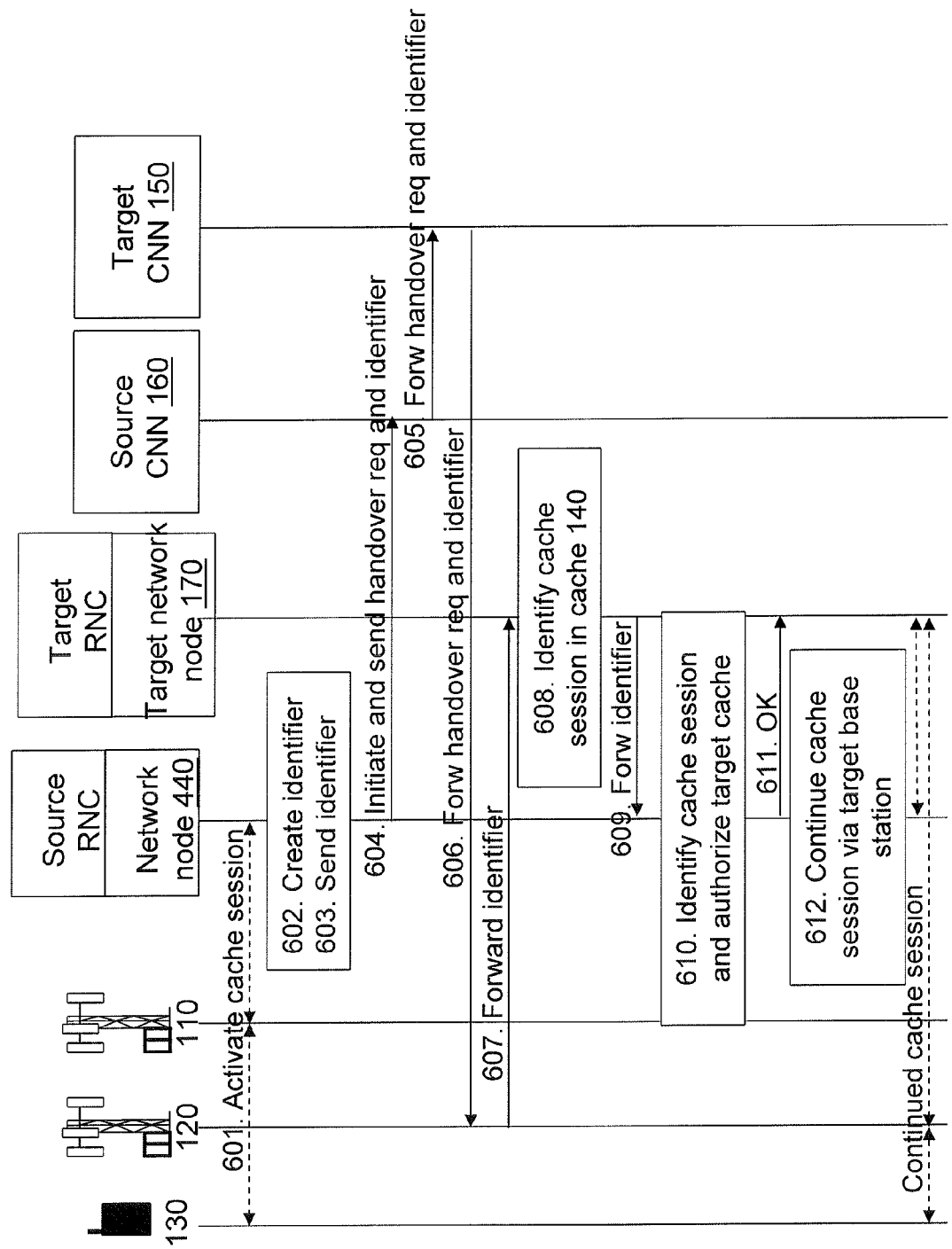
FIG. 6 is a combined flowchart and signalling scheme depicting embodiments in a wireless communications system.

A method for handling a cache session between the network node 440 and the user equipment 130 during a handover of the user equipment 130 from the source cell 115 of the first RAT to a target cell 125 of the second RAT according to some embodiments wherein the, will now be described with reference to the combined signalling diagram and flowchart depicted in FIG. 6. In these embodiments, FIG. 6 exemplifies embodiments herein regarding an IRAT handover from the source cell 115 using WCDMA, to the target cell 125 using LTE. This example concerns the case when different network nodes are used, i.e. network node 440 being the source network node used in the source cell 115 and the target network node 170 is used in the target cell. I.e. the target network node 170 is associated with the target cell 125 and the network node 440 is a source network node associated with the source cell 115. The Actions 601-606 in FIG. 6 are exactly same as the Actions 301-306 in FIG. 3. Therefore the steps 601-606 are very briefly described in relation to FIG. 6. Different actions are performed from Action 607 when the target network node 170 identifies by the existence and contents of the identifier that the source cache, i.e. the network node 440 is performing cache play-out towards the user equipment performing handover. The method comprises the following actions, which actions may as well be carried out in another suitable order than described below:

Action 601

The user equipment 130 is active in the source cell 115 and have need of starting a play-out for a media stream, such as e.g. a video. Thus the network node 440 activates a cache session. In some embodiments more than one cache session may be activated in parallel. The cache session is associated with the play-out for the media stream to the user equipment 130 via the source base station 110 serving the user equipment 130 in the source cell 115. The network node 440 is performing play-out for at least one media stream. The user equipment session in the network node 440 is known by identifiers specific for the RAT in the source cell 115. This action is similar to Action 201.

Action 602

In this action, the network node 440 creates an identifier. The identifier identifies the cache session in the network node 440. This means e.g. that the network node 440 may select an identifier such as a common RAN cache identifier that identifies the specific user equipment session or possibly sessions activated in the network node 440. This action is similar to Action 302. In some embodiments the a security information is also created in this action, which security information is attached to the identifier to be sent in the handover request.

Action 603

The network node 440 sends the identifier to a source RNC for forwarding. The RNC may be located in the same unit as the network node 440 as the example in FIG. 6. This is to enable the identifier to be added to a handover request initiated by the source RNC. In WCDMA the RNC is the node that initiates an IRAT handover. The identifier is added to a handover request to be sent to the target base station 120 via the target core network node 150 via the source network node 160 such as a source SGSN. The identifier may be forwarded transparently in an StTTC. Here the target RAT is LTE, so the identifier may be included in the "Source eNB to Target eNB Transparent Container FE". This action may be similar to Action 203.

Action 604

The RNC sends the identifier in a handover request message to the source core network node 160 such as a source SGSN for forwarding. This may e.g. be performed in a relocation request message. The identifier may be forwarded transparently in the StTTC.

Action 605

The source core network node 160 forwards the received identifier e.g. in a forward relocation request message to the target network node 150 such as a target MME for forwarding. This may e.g. be performed transparently in the StTTC.

Action 606

The target network node 150 forwards the identifier comprised in the handover request to the target base station 120. The identifier may be forwarded transparently in the StTTC.

Action 607

The target base station 120 forwards the handover request comprising the identifier to the target network node 170. In this case the identifier may be forwarded as part of new signalling between the target base station 120 and the target network node 170 as the handover preparation signalling is terminated in the target base station 120. The target network node 170 receives the identifier from the target base station 120.

Action 608

The target network node 440 receives the identifier identifying the cache session and the source network node, i.e. the network node 440.

I.e. in this Action the target network node 170 identifies by means of the existence and contents of the identifier that the source network node, i.e. the network node 440 is performing a cache session play-out towards the user equipment 130 that is performing a handover.

Action 609

In this step the identifier is forwarded by the target network node 170 to the network node 440. The identifier is received from the target network node 170 and may be comprised in a message such as a target cache transport information message. The message may indicate that the identified cache session shall be continued by forwarding the play-out of the media stream via the target network node 170 to the user equipment 130. The identifier is used by the target network node 170 to contact the correct source cache, in this case the network node 440. The target network node 170 informs the network node 440 to prepare for the handover by sending to the network node 440, information comprising the identifier identifying the cache session.

E.g., the target network node 170 may provide "Target Transport Information" to the network node 440 and this information informs the source cache, i.e. network node 440 how it is supposed to forward the cache play-out for this user equipment 130 to the target network node 170. The information may be included as part of "Target Transport Information" such as for example IP address, UDP port and TEID for the case when GTP-U is used between source network node 440 and the target network node 170.

Action 610

The network node 440 receives the identifier from the target network node 170 and identifies the activated cache session as pertaining to the user equipment 130 subject to said handover, by means of the received identifier. I.e. the network node 440 identifies and relates the received handover request to the user equipment 130 and its cache play-out that now moves towards the new target network node 170. This enables the network node 440 to continue the play-out from the network node 440 after the handover is performed. It is assumed that GTP-U may also be used as the protocol between the different caches.

In some embodiments, the security information is created and attached to the identifier in the Action 602, which identifier is received via the target network node 170. In these embodiments the network node 440 authorize the target network node 170 to receive the play-out of the media stream for forwarding it to the user equipment 130. This may be performed by establishing that the received security information corresponds to the created security information.

Action 611

In some embodiments, the network node 440 sends a notification to the target network node 170 that it has been authorized to receive the play-out of the media stream for forwarding it to the user equipment 130. This may be performed by sending an acknowledgement of the received information comprising the identifier to the target network node 170.

Action 612

The network node 440 continues the identified cache session via the target base station 120 serving the target cell 125. This is performed when the handover of the user equipment 130 from the source cell 115 to the target cell 125 has been performed.

In these embodiments, the identified cache session is continued by transmitting the play-out of the media stream via the target network node 170 and via the target base station 120 to the user equipment 130.

In some embodiments, GTP-U is used as protocol for the transmission of the play-out of the media stream from the network node 440 to the target network node 170.

In the text below, embodiments herein will described in a general way seen from the perspective of the network node 140 and 440.

Figure 7:
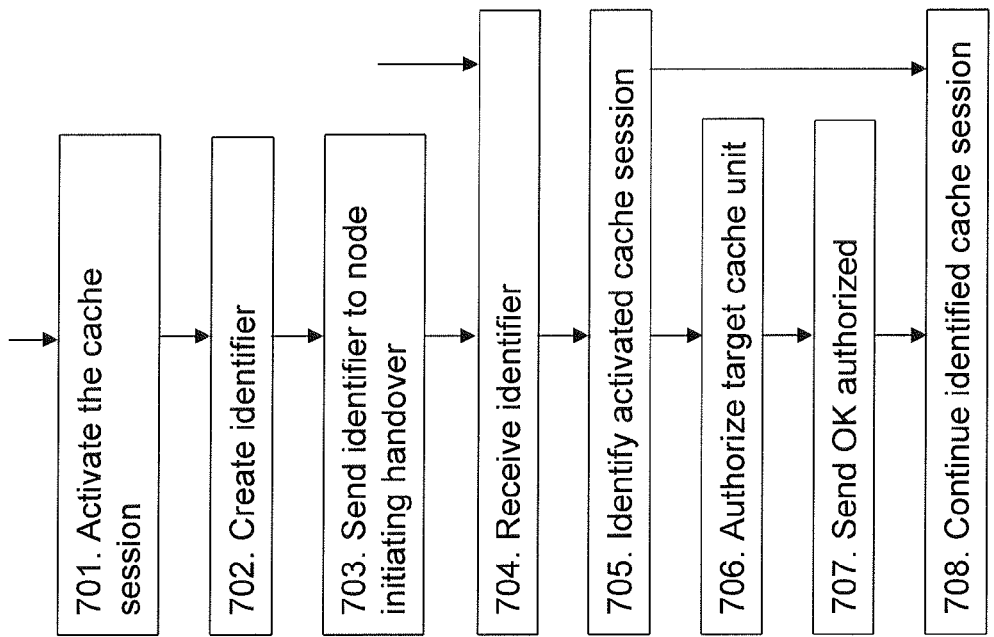
FIG. 7 is a flowchart illustrating embodiments of a method in network node.

Embodiments of a method in the network node 140, 440 for handling a cache session between the network node 140, 440 and the user equipment 130 during a handover of the user equipment 130 from the source cell 115 of a first RAT, to the target cell 125 of the second RAT being different from the first RAT, will now be described with reference to the flowchart depicted in FIG. 7. As mentioned above the user equipment 130 and network node 140, 440 are comprised in a wireless communications system 100. The method comprises the following actions, which actions may as well be carried out in another suitable order than described below.

Action 701

In some embodiments, the network node 140, 440 activates the cache session. The cache session is associated with a play-out for a media stream to the user equipment 130 via a source base station 110 serving the user equipment 130 in the source cell 115.

This Action corresponds to the Actions 201, 301, 501 and 601 above.

Action 702

In some embodiments, the network node 140, 440 creates an identifier. The identifier identifies the cache session in the network node 140, 440.

In some embodiments this action further comprises creating a security information.

In some embodiments the target network node 170 is associated with the target cell 125, and the network node 440 is a source network node associated with the source cell 115. In some embodiments the identifier further identifies the network node 140, 440. This enables the target network node 170 to send the identifier to the network node 140, 440. The identifier will be received by the network node 140, 440 via the target network node 170 in the Action 704 of receiving the identifier described below.

This Action corresponds to the Actions 202, 302, 502, 602 above.

Action 703

In some embodiments, the network node 140, 440 provides the identifier to the radio access network node initiating inter RAT handovers such as e.g. the source base station 110 or to the source radio network controller.

In some embodiments wherein the security information is created, it is sent together with the identifier to the radio access network node initiating inter RAT handovers.

In some embodiments this action is performed via a control plane interface between the network node 140, 440 and the source base station 110 or between the network node 140, 440 and the source radio network controller.

In some embodiments this action is performed by adding the identifier in user plane packets to be sent to the user equipment 130 via the source base station 110 or via the source radio network controller.

This Action corresponds to the Actions 203, 303, 503, 603 above.

Action 704

The network node 140, 440 receives the identifier. The identifier may e.g. be received from the target radio base station 120 or from the target radio network controller.

In some embodiments wherein the identifier is received from the target network node 170, may be comprised in a target cache transport information message.

This Action corresponds to the Actions 207, 307, 509, 609 above.

Action 705

The network node 140, 440 identifies the activated cache session as pertaining to the user equipment 130 subject to said handover, by means of the received identifier.

In some embodiments the identifier is received in a message. The message indicates that the identified cache session shall be continued by forwarding the play-out of the media stream via the target network node 170 to the user equipment 130.

This Action corresponds to the Actions 208, 308, 510, 610 above.

Action 706

In some embodiments wherein the identifier received via the target network node 170, further comprises a received security information. In these embodiments the network node 140, 440 authorizes the target network node 170 to receive the play-out of the media stream for forwarding it to the user equipment 130, by establishing that the received security information corresponds to the created security information.

This Action corresponds to the Actions 510, 610 above.

Action 707

In the embodiments wherein Action 706 has been performed, the network node 140, 440 may send a notification to the target network node 170 that it has been authorized to receive the play-out of the media stream for forwarding it to the user equipment 130.

This Action corresponds to the Actions 511, 611 above.

Action 708

The network node 140, 440 continues the identified cache session via a target base station 120 serving the target cell 125, when the handover of the user equipment 130 from the source cell 115 to the target cell 125 has been performed.

This Action corresponds to the Actions 209, 309, 512, 612 above.

In some embodiments, the identified cache session is continued by transmitting the play-out of the media stream via the target network node 170 and via the target base station 120 to the user equipment 130. In these embodiments, the General Packet Radio Service Tunnelling Protocol User Plane is used as protocol for the transmission of the play-out of the media stream from the network node 140, 440 to the target network node 170.

Figure 8:
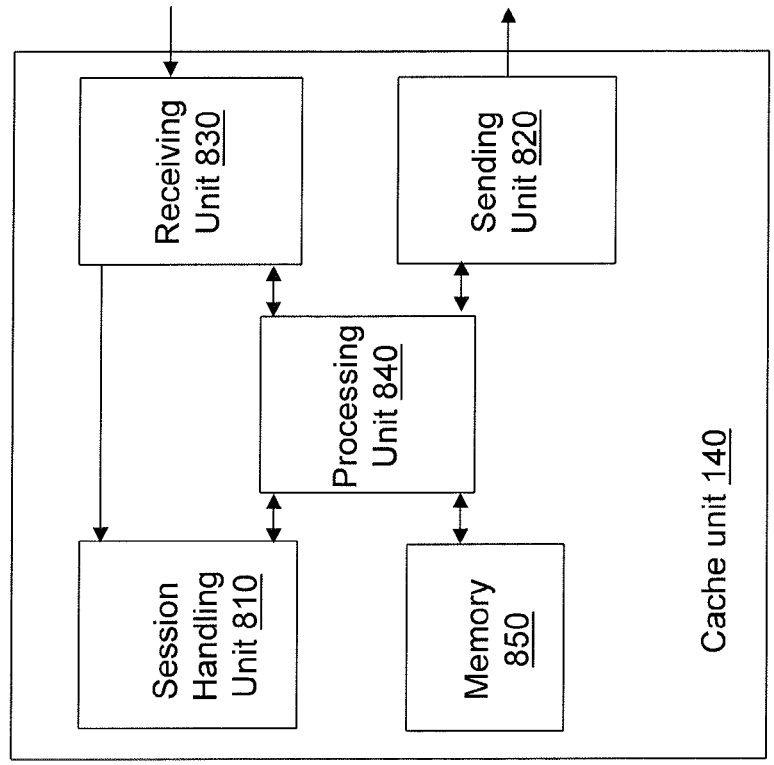
FIG. 8 is a schematic block diagram illustrating embodiments of a network node.

To perform the method actions in the network node 140, 440 described above for handling a cache session between the network node 140, 440 and a user equipment 130 during a handover of the user equipment 130 from a source cell 115 of a first Radio Access Technology, RAT, to a target cell 125 of a second RAT being different from the first RAT, the network node 140, 440 comprises the following arrangement depicted in FIG. 8. As mentioned above the user equipment 130 and the network node 140, 440 are comprised in a wireless communications system 100.

The network node 140, 440 comprises a session handling unit 810.

In some embodiments, the session handling unit 810 is configured to create an identifier. The identifier identifies the cache session in the network node 140, 440. The cache session is associated with a play-out for a media stream to the user equipment 130 via the source base station 110 serving the user equipment 130 in the source cell 115.

The session handling unit 810 is further configured to identify the ongoing cache session as pertaining to the user equipment 130 subject to said handover, by means of the identifier when it is received.

The session handling unit 810 is further configured to continue the identified cache session by transmitting the play-out of the media stream via the target network node 170 and via the target base station 120 to the user equipment 130.

In some embodiments the network node 140, 440 further comprises a sending unit 820 configured to provide the identifier to the radio access network node initiating inter RAT handovers such as e.g. the source base station 110 or to a source radio network controller. This enables the identifier to be added to a handover request to be sent to a target core network node 150 initiated by the source base station 110.

The sending unit 820 may further be configured to provide the identifier to the radio access network node initiating inter RAT handovers via a control plane interface between the network node 140, 440 and the source base station 110 or between the network node 140, 440 and the source radio network controller.

The sending unit may further be configured to provide the identifier to the radio access network node initiating inter RAT handovers by adding the identifier in user plane packets to be sent to the user equipment 130 via the source base station 110 or via the source radio network controller.

The sending unit 820 may further be configured to use General Packet Radio Service Tunnelling Protocol User Plane as a protocol for the transmission of the play-out of the media stream from the network node 140, 440 to the target network node 170.

The network node 140, 440 further comprises a receiving unit 830 configured to receive the identifier e.g. from the target radio base station 120 or from the target radio network controller.

The sending unit is further configured to continue the identified cache session via a target base station 120 serving the target cell 125, when the handover of the user equipment 130 from the source cell 115 to the target cell 125 has been performed.

In some embodiments the target network node 170 is associated with the target cell 125, and the network node 140, 440 is a source network node associated with the source cell 115. In some embodiments the identifier further identifies the network node 140, 440. This enables the target network node 170 to send the identifier to the network node 140, 440. The receiving unit 830 further is configured to receive the identifier via the target network node 170.

In some embodiments the identifier received from the target network node 170 is arranged to be comprised in a target cache transport information message.

In some embodiments identifier is arranged to be received in a message. The message may indicate that the identified cache session shall be continued by forwarding the play-out of the media stream via the target network node 170 to the user equipment 130.

In some embodiments the session handling unit 810 is further configured to create a security information, the sending unit 820 is further configured to provide the security information together with the identifier to the radio access network node initiating inter RAT handovers, and the identifier being received via the target network node 170 further comprises a received security information.

In these embodiments the session handling unit 810 further is configured to authorize the target network node 170 to receive the play-out of the media stream for forwarding it to the user equipment 130, by establishing that the received security information corresponds to the created security information.

In some embodiments the sending unit 820 is further configured to send a notification to the target network node 170 that it has been authorized to receive the play-out of the media stream for forwarding it to the user equipment 130.

The embodiments of the network node 140, 440 for handling a cache session between the network node 140, 440 and the user equipment 130 during a handover of the user equipment 130 from a source cell 115 of a first RAT to a target cell 125 of a second RAT being different from the first RAT may be implemented through one or more processors, such as the processing unit 840 in network node 140, 440 depicted in FIG. 8, together with computer program code for performing the actions of the embodiments herein. The program code mentioned above may also be provided as a computer program product, for instance in the form of a data carrier carrying computer program code for performing the embodiments herein when being loaded into network node 140, 440. One such carrier may be in the form of a CD ROM disc. It is however feasible with other data carriers such as a memory stick. The computer program code may furthermore be provided as pure program code on a server and downloaded to the network node 140, 440, e.g. remotely.

The communication device 120 may further comprise a memory 850 comprising one or more memory units. The memory 850 is arranged to be used to store data such as e.g. the identifier, security information, applications to perform the actions of the embodiments herein when being executed in the network node 140, 440.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a base station configured for operation in a first network, the method comprising:
   transmitting media content to a user equipment served by the base station, as part of an ongoing play-out of the media content to the user equipment for a cache session established between the user equipment and a cache node associated with the first network;
   receiving a cache session identifier from the cache node, identifying the cache session at the cache node;
   determining that the user equipment is being handed over in an inter-Radio-Access-Technology (inter-RAT) handover to a second network while the cache session is still established; and
   sending handover signaling towards the second network that includes the cache session identifier in a transparent container passing transparently to the second network and thereby enabling the second network to continue the cache session between the cache node and the user equipment, based on contacting the cache node using the cache session identifier.

2. The method of claim 1, wherein the transparent container is a Source to Target Transparent Container (StTTC) that passes transparently from the base station to a base station in the second network, via core network nodes of the first and second networks.

3. The method of claim 1, wherein receiving the cache session identifier comprises receiving the cache session identifier via a control plane interface between the cache node and the base station.

4. The method of claim 1, wherein receiving the cache session identifier comprises receiving the cache session identifier embedded in user plane packets received by the base station for transmission to the user equipment.

5. The method of claim 1, wherein receiving the cache session identifier comprises receiving the cache session identifier from a Radio Network Controller (RNC) associated with the base station.

6. The method of claim 1, wherein the cache session identifier includes a network address for use by the second network in accessing the cache node, for continuation of the cache session by the second network.

7. A method performed by a cache node associated with a first network, the method comprising:
   establishing a cache session with a user equipment served by a base station of the first network;
   playing-out media content to the user equipment for the cache session via the base station;
   providing a cache session identifier for the cache session to the base station;
   receiving the cache session identifier from a second network, subsequent to the user equipment being handed over in an inter-Radio-Access-Technology (inter-RAT) handover to the second network while the cache session is still established;
   continuing the cache session with the user equipment via the second network, based on identifying the cache session from the cache session identifier; and
   continuing play-out of the media content for the cache session towards the second network.

8. The method of claim 7, further comprising:
   creating security information corresponding to the cache session;
   providing the security information to the base station, for forwarding to the second network in association with the inter-RAT handover;
   receiving the security information with the cache session identifier from the second network subsequent to the inter-RAT handover; and
   authorizing the second network to continue the cache session, by establishing that the received security information corresponds to the created security information.

9. The method of claim 7, wherein providing the cache session identifier to the base station comprises providing the cache session identifier via a control plane interface to the base station.

10. The method of claim 7, wherein providing the cache session identifier to the base station comprises embedding the cache session identifier in user plane packets sent to the base station for transmission to the user equipment.

11. The method of claim 7, wherein providing the cache session identifier to the base station comprises providing the cache session identifier via a radio network controller (RNC) associated with the base station.

12. A base station configured for operation in a first network, the base station comprising:
   a communication interface configured for communication with one or more other nodes and a user equipment served by the base station; and
   a processor operatively associated with the communication interface and configured to:
      transmit media content to the user equipment, via the communication interface, as part of an ongoing play-out of the media content to the user equipment for a cache session established between the user equipment and a cache node associated with the first network;
      receive a cache session identifier from the cache node, identifying the cache session at the cache node;
      determine that the user equipment is being handed over in an inter-Radio-Access-Technology (inter-RAT) handover to a second network while the cache session is still established; and
      send handover signaling towards the second network that includes the cache session identifier in a transparent container passing transparently to the second network and thereby enable the second network to continue the cache session between the cache node and the user equipment, based on contacting the cache node using the cache session identifier.

13. The base station of claim 12, wherein the transparent container is a Source to Target Transparent Container (StTTC) that passes transparently from the base station to a base station in the second network, via core network nodes of the first and second networks.

14. The base station of claim 12, wherein the processor is configured to receive the cache session identifier via a control plane interface between the cache node and the base station.

15. The base station of claim 12, wherein the processor is configured to receive the cache session identifier embedded in user plane packets received by the base station for transmission to the user equipment.

16. The base station of claim 12, wherein the processor is configured to receive the cache session identifier from a radio network controller (RNC) associated with the base station.

17. The base station of claim 12, wherein the cache session identifier includes a network address for use by the second network in accessing the cache node, for continuation of the cache session by the second network.

18. A cache node associated with a first network, the cache node comprising:
- a communication interface configured for communication with one or more other nodes; and
- a processor operatively associated with the communication interface and configured to:
  - establish a cache session with a user equipment served by a base station of the first network;
  - play-out media content to the user equipment for the cache session via the base station;
  - provide a cache session identifier for the cache session to the base station;
  - receive the cache session identifier from a second network, subsequent to the user equipment being handed over in an inter-Radio-Access-Technology (inter-RAT) handover to the second network while the cache session is still established;
  - continue the cache session with the user equipment via the second network, based on identifying the cache session from the cache session identifier; and
  - continue play-out of the media content for the cache session towards the second network.

19. The cache node of claim 18, wherein the processor is configured to:
- create security information corresponding to the cache session;
- provide the security information to the base station, for forwarding to the second network in association with the inter-RAT handover;
- receive the security information with the cache session identifier from the second network subsequent to the inter-RAT handover; and
- authorize the second network to continue the cache session, by establishing that the received security information corresponds to the created security information.

20. The cache node of claim 18, wherein the processor is configured to provide the cache session identifier via a control plane interface to the base station.

21. The cache node of claim 18, wherein the processor is configured to embed the cache session identifier in user plane packets sent to the base station for transmission to the user equipment.

22. The cache node of claim 18, wherein the processor is configured to provide the cache session identifier via a radio network controller (RNC) associated with the base station.

\* \* \* \* \*